(12) United States Patent
Yoshimine et al.

(10) Patent No.: US 9,444,114 B2
(45) Date of Patent: Sep. 13, 2016

(54) FUEL CELL SYSTEM (71) Applicant: HONDA MOTOR CO., LTD., Tokyo (JP)

(72) Inventors: Yuki Yoshimine, Wako (JP); Tetsuya Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 14/396,605

(22) PCT Filed: Apr. 18, 2013

(86) PCT No.: PCT/JP2013/062143
§ 371 (c)(1),
(2) Date: Oct. 23, 2014

(87) PCT Pub. No.: WO2013/168578
PCT Pub. Date: Nov. 14, 2013

(65) Prior Publication Data
US 2015/0093662 A1 Apr. 2, 2015

(30) Foreign Application Priority Data
May 10, 2012 (JP) .................. 2012-108765

(51) Int. Cl.
*H01M 8/04* (2016.01)
*H01M 8/24* (2016.01)
(Continued)

(52) U.S. Cl.
CPC ..... *H01M 8/04932* (2013.01); *H01M 8/04104* (2013.01); *H01M 8/04291* (2013.01); *H01M 8/04753* (2013.01); *H01M 8/2475* (2013.01); *H01M 8/04014* (2013.01); *H01M 8/04156* (2013.01); *H01M 8/0612* (2013.01);
(Continued)

(58) Field of Classification Search
CPC .............. H01M 8/2475; H01M 8/04753
See application file for complete search history.

(56) References Cited

U.S. PATENT DOCUMENTS

| 2004/0121206 A1* | 6/2004 | Illner | H01M 8/04074 429/437 |
| 2010/0104902 A1* | 4/2010 | Ogawa | H01M 8/04007 429/411 |
| 2015/0125765 A1* | 5/2015 | Yoshimine | H01M 8/2475 429/413 |

FOREIGN PATENT DOCUMENTS

| JP | 63-238346 | 10/1988 |
| JP | 05-290868 | 11/1993 |

(Continued)

OTHER PUBLICATIONS

Japanese Office Action with partial English translation, dated Jul. 21, 2015, 4 pages.

Primary Examiner — Stewart Fraser
Assistant Examiner — Olatunji Godo
(74) Attorney, Agent, or Firm — Rankin, Hill & Clark LLP (57) ABSTRACT A casing of a fuel cell system is divided into a fluid supply section, a module section, and an electrical equipment section by a first vertical partition plate and a second vertical partition plate. The first vertical partition plate extends from a front plate of the casing toward a back plate of the casing. The first vertical partition plate has a recess formed by bending a marginal end portion of the first vertical partition plate on the back plate side toward the module section at a predetermined angle. At least a raw fuel pipe of the fuel gas supply apparatus as a passage of a raw fuel is provided in the recess.

4 Claims, 9 Drawing Sheets (51) Int. Cl.
*H01M 8/06* (2016.01)
*H01M 8/12* (2016.01)

(52) U.S. Cl.
CPC ............... *H01M2008/1293* (2013.01); *H01M 2250/405* (2013.01); *Y02B 90/16* (2013.01); *Y02E 60/50* (2013.01); *Y02E 60/525* (2013.01)

(56) References Cited

FOREIGN PATENT DOCUMENTS

| JP | 11-200951 | 7/1999 |
| JP | 2004-148850 | 5/2004 |
| JP | 2008-027855 | 2/2008 |

\* cited by examiner

FUEL CELL SYSTEM

TECHNICAL FIELD

The present invention relates to a fuel cell system including a fuel cell module, a fuel gas supply apparatus, an oxygen-containing gas supply apparatus, a water supply apparatus, a power converter, a control device, and a casing containing the fuel cell module, the fuel gas supply apparatus, the oxygen-containing gas supply apparatus, the water supply apparatus, the power converter, and the control device.

BACKGROUND ART

Typically, a solid oxide fuel cell (SOFC) employs a solid electrolyte of ion-conductive oxide such as stabilized zirconia. The electrolyte is interposed between an anode and a cathode to form an electrolyte electrode assembly, for example, a membrane electrode assembly (MEA). The electrolyte electrode assembly is sandwiched between separators (bipolar plates). In use, normally, predetermined numbers of the electrolyte electrode assemblies and the separators are stacked together to form a fuel cell stack.

As the fuel gas supplied to the fuel cell, normally, a hydrogen gas generated from hydrocarbon based raw material by a reformer is used. In general, in the reformer, a reformed raw material gas is obtained from hydrocarbon based raw material of a fossil fuel or the like, such as methane or LNG, and thereafter, the reformed raw material gas undergoes steam reforming, partial oxidation reforming, or autothermal reforming to produce a reformed gas (fuel gas).

In this regard, a fuel cell system (fuel cell power supply apparatus) having a single unit case containing various types of components, e.g., a fuel cell, a reformer, a power converter for converting direct current power generated in the fuel cell according to a power supply output specification, a control device, and auxiliary (accessory) devices is known.

Figure 9:
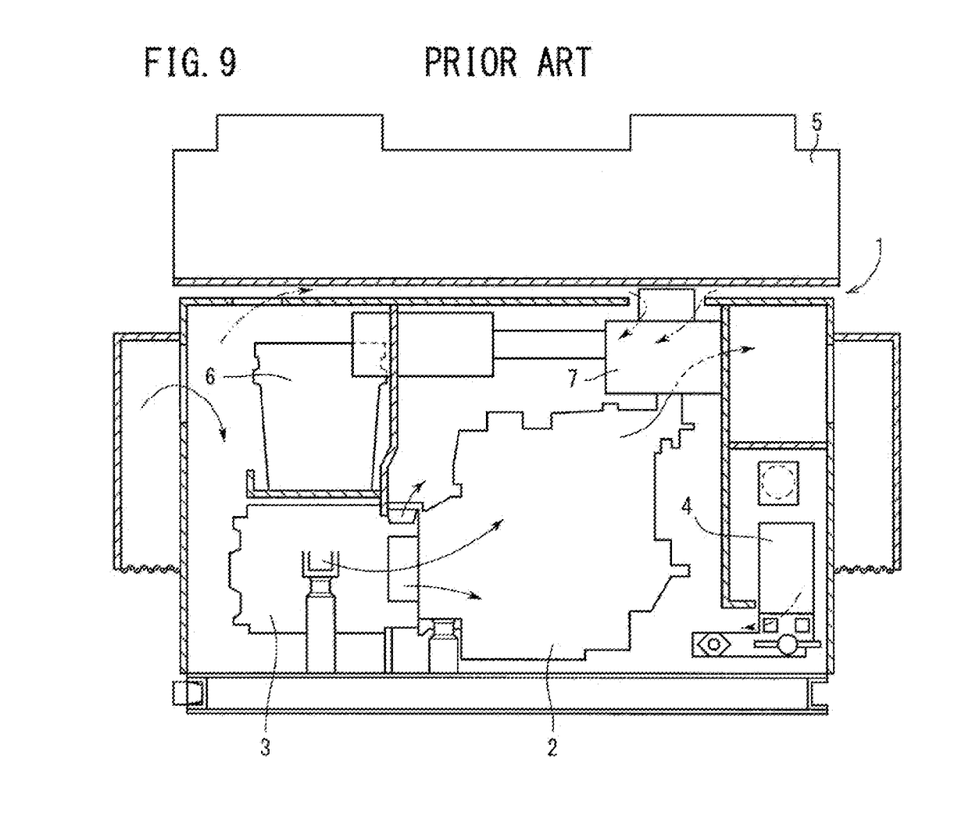
FIG. 9 is a view schematically showing a co-generation apparatus of the conventional technique 1.

As a technique which adopts the system of this type, for example, a co-generation apparatus disclosed in Japanese Laid-Open Patent Publication No. 11-200951 (hereinafter referred to as conventional technique 1) is known. As shown in FIG. 9, a soundproof case 1 contains a gas engine 2 and a power generator 3 driven by the gas engine 2. An electrically operated coolant water pump 4 and a hot water bath (not shown) are provided adjacent to the gas engine 2. Hot water warmed by a heat exchanger (not shown) is supplied to, and stored in the hot water bath.

A waste heat radiator 5 for cooling coolant water is provided outside the soundproof case 1. A reserve tank 6 is provided above the power generator 3, and a ventilating fan 7 for air ventilation in the soundproof case 1 using electrical power generated by the power generator 3 is provided above the gas engine 2.

SUMMARY OF INVENTION

In the conventional technique 1, the soundproof case 1 contains various types of components. In this regard, in order to reduce the overall size of the apparatus, it is desired to efficiently arrange a large number of components close to each other. However, since a large number of cables and pipes are connected to the components, cables and pipes cannot be arranged efficiently in a limited space. Therefore, the layout of the components cannot be determined easily, and it is difficult to improve the efficiency of utilizing the available space.

The present invention has been made to solve the problems of this type, and an object of the present invention is to provide a fuel cell system having simple and compact structure, in which it becomes possible to improve the efficiency of arranging pipes in a limited space, and the fuel cell system can be provided suitably in a small space.

The present invention relates to a fuel cell system including a fuel cell module for generating electrical power by electrochemical reactions of a fuel gas and an oxygen-containing gas, a fuel gas supply apparatus for supplying the fuel gas to the fuel cell module, an oxygen-containing gas supply apparatus for supplying the oxygen-containing gas to the fuel cell module, a water supply apparatus for supplying water to the fuel cell module, a power converter for converting direct current power generated in the fuel cell module to electrical power according to requirements specification, a control device for controlling an amount of electrical power generated in the fuel cell module, and a casing containing the fuel cell module, the fuel gas supply apparatus, the oxygen-containing gas supply apparatus, the water supply apparatus, the power converter, and the control device.

In the fuel cell system, the casing is divided by partition members into a module section where the fuel cell module is provided, a fluid supply section where the fuel gas supply apparatus, the oxygen-containing gas supply apparatus, and the water supply apparatus are provided, and an electrical equipment section where the power converter and the control device are provided. The partition member dividing at least the module section from the fluid supply section or the electrical equipment section includes a recess recessed toward the module section, and at least any of a fuel gas pipe of the fuel gas supply apparatus as a passage of the fuel gas, an oxygen-containing gas pipe of the oxygen-containing gas supply apparatus as a passage of the oxygen-containing gas, and a water pipe of the water supply apparatus as a passage of the water is provided in the recess.

In the present invention, a fluid pipe which is any of the fuel gas pipe, the oxygen-containing gas pipe, and the water pipe is provided in a recess formed by the partition member. That is, the fluid pipe is provided in a dead space of a lower temperature area separated from the module section by the partition member.

Therefore, the fluid flowing through the fluid pipe is not thermally affected by the module section, and the temperature of the fluid does not become high easily. In the structure, improvement in the durability of components such as sensors and electronic parts attached to the fluid pipe is achieved. Further, in the casing, the space required for pipes can be reserved in the dead space in the casing. Therefore, it becomes easier to arrange pipes efficiently in a limited space, and the overall size of the casing can be reduced easily.

DESCRIPTION OF EMBODIMENTS

A fuel cell system 10 according to a first embodiment of the present invention shown in FIGS. 1 to 4 is used in various applications, including stationary and mobile applications. For example, the fuel cell system 10 is mounted on a vehicle.

The fuel cell system 10 includes a fuel cell module 12 for generating electrical energy in power generation by electrochemical reactions of a fuel gas (hydrogen gas) and an oxygen-containing gas (air), a combustor 14 for raising the temperature of the fuel cell module 12, a fuel gas supply apparatus (including a fuel gas pump) 16 for supplying the fuel gas to the fuel cell module 12, an oxygen-containing gas supply apparatus (including an air pump) 18 for supplying an oxygen-containing gas to the fuel cell module 12, a water supply apparatus (including a water pump) 20 for supplying water to the fuel cell module 12, a power converter 22 for converting the direct current power generated in the fuel cell module 12 to electrical power according to the requirements specification, and a control device 24 for controlling the amount of electrical power generated in the fuel cell module 12. The fuel cell module 12, the combustor 14, the fuel gas supply apparatus 16, the oxygen-containing gas supply apparatus 18, the water supply apparatus 20, the power converter 22, and the control device 24 are disposed in a single casing 26. The fuel cell module 12 and the combustor 14 are surrounded by heat insulating material 27 (see FIG. 3).

Figure 4:
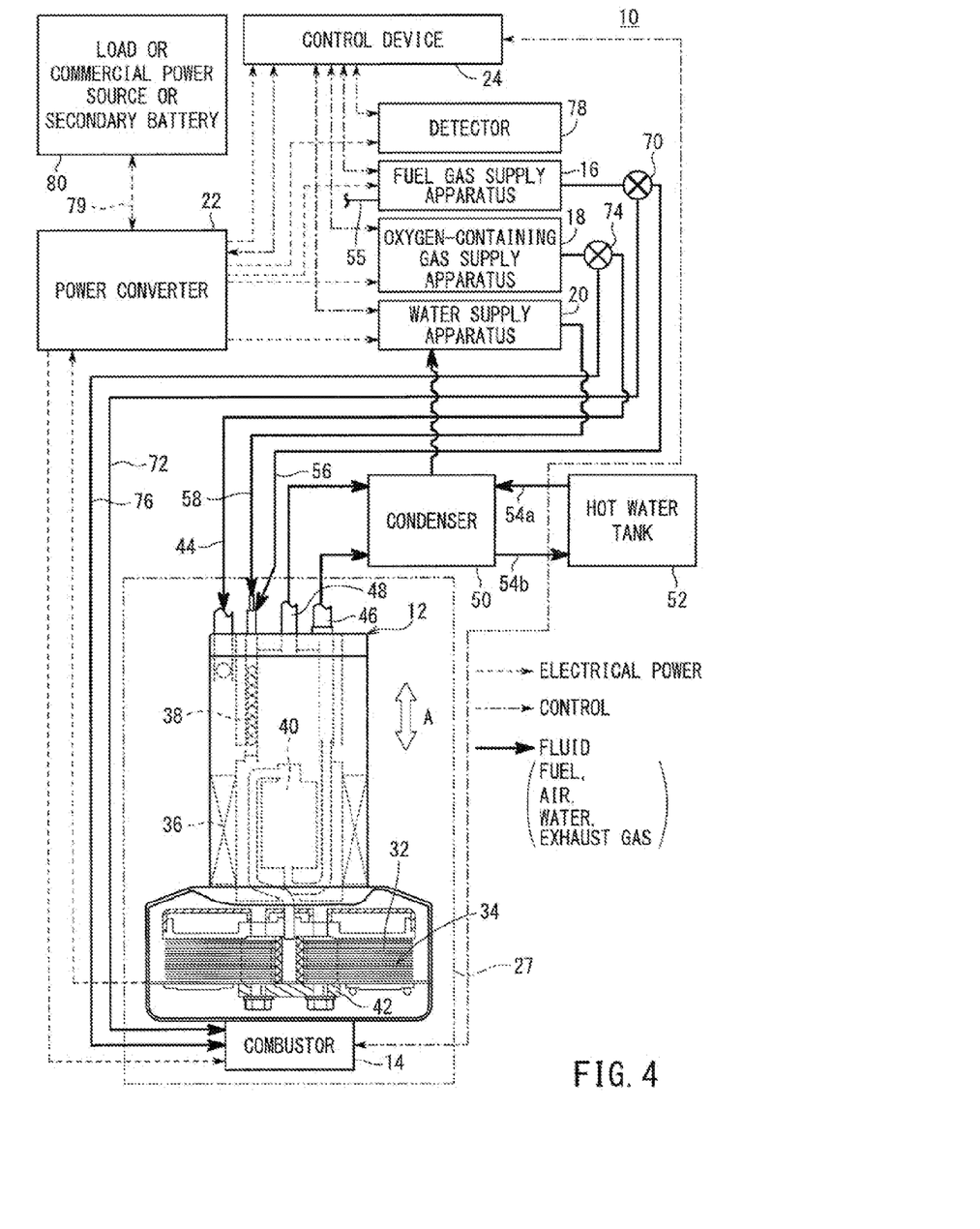
FIG. 4 is a circuit diagram showing the fuel cell system.

As shown in FIG. 4, the fuel cell module 12 includes a fuel cell stack 34 formed by stacking a plurality of solid oxide fuel cells 32 in a vertical direction. The fuel cells 32 are formed by stacking electrolyte electrode assemblies and separators. Though not shown, each of the electrolyte electrode assemblies includes a cathode, an anode, and a solid electrolyte (solid oxide) interposed between the cathode and the anode. For example, the electrolyte is made of ion-conductive solid oxide such as stabilized zirconia.

Figure 3:
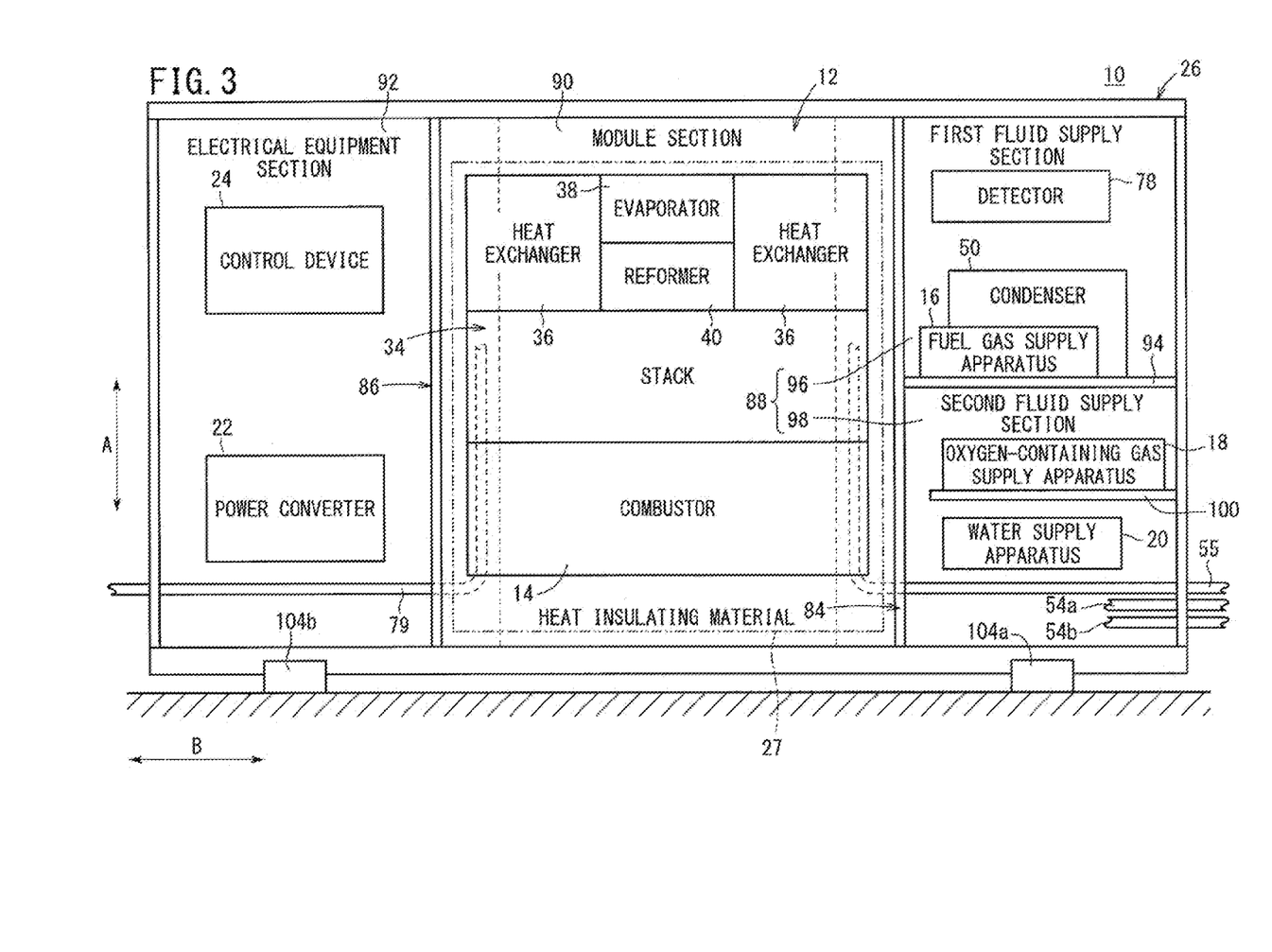
FIG. 3 is a front view showing the fuel cell system.

As shown in FIG. 3, at an upper end of the fuel cell stack 34 in the stacking direction, a heat exchanger 36 for heating the oxygen-containing gas before the oxygen-containing gas is supplied to the fuel cell stack 34, an evaporator 38 for evaporating water to produce a mixed fuel of water vapor and a raw fuel (e.g., city gas) chiefly containing hydrocarbon, and a reformer 40 for reforming the mixed fuel to produce a reformed gas are provided.

At a lower end of the fuel cell stack 34 in the stacking direction, a load applying mechanism 42 for applying a tightening load to the fuel cells 32 of the fuel cell stack 34 in the direction indicated by the arrow A is provided (see FIG. 4).

The reformer 40 is a preliminary reformer for reforming higher hydrocarbon ($C_{2+}$) such as ethane ($C_2H_6$), propane ($C_3H_8$), and butane ($C_4H_{10}$) in the city gas by steam reforming. The operating temperature of the reformer 40 is several hundred ° C.

The operating temperature of the fuel cell 32 is high, at several hundred ° C. In the electrolyte electrode assembly, methane in the fuel gas is reformed to obtain hydrogen, and the hydrogen is supplied to the anode.

As shown in FIG. 4, at the heat exchanger 36, a partially consumed reactant gas discharged from the fuel cell stack 34 (hereinafter also referred to as the exhaust gas or the combustion exhaust gas) and the air as heated fluid supplied from an air supply pipe 44 flow in a counterflow manner. After the exhaust gas flows through the heat exchanger 36, the exhaust gas is supplied to the evaporator 38 as a heat source for evaporating water. Then, the exhaust gas is discharged into a main exhaust pipe 46. Some of the exhaust gas heats the reformer 40, and then, the exhaust gas is discharged into an exhaust pipe 48.

A condenser 50 is connected to the main exhaust pipe 46 and the exhaust pipe 48. By heat exchange between the exhaust gas discharged from the fuel cell module 12 and the coolant, the condenser 50 condenses and collects the water vapor in the exhaust gas, and then, the condenser 50 supplies the condensed water to the water supply apparatus 20. As the coolant, for example, hot water stored in a hot water tank 52 is used.

The hot water tank 52 is provided outside the casing 26. The hot water tank 52 is connected to the condenser 50 through a coolant supply pipe 54a and a coolant discharge pipe 54b. While the hot water flows through the coolant supply pipe 54a, the hot water in the hot water tank 52 is heated by heat exchange with the exhaust gas, and the heated hot water is returned to the hot water tank 52 through the coolant discharge pipe 54b.

As shown in FIG. 4, the fuel gas supply apparatus 16 is connected to a raw fuel supply source (not shown) provided outside the casing 26 through a raw fuel pipe 55. The fuel gas supply apparatus 16 is connected to a raw fuel channel 56. A raw fuel branch channel 72 is connected to some point in the raw fuel channel 56 through a switching valve 70. The raw fuel branch channel 72 is connected to the combustor 14.

The oxygen-containing gas supply apparatus 18 is connected to the air supply pipe 44, and an air branch channel 76 is connected to a switching valve 74 provided at some point in the air supply pipe 44. The air branch channel 76 is connected to the combustor 14. For example, the combustor 14 has a burner, and as described above, the raw fuel and the air are supplied to the combustor 14. Instead of the burner, other means (e.g., electric heater) may be adopted. In this case, the raw fuel, the air, and electrical power (electrical energy) should be supplied selectively as necessary.

A water channel 58 is connected to the water supply apparatus 20. The fuel gas supply apparatus 16, the oxygen-containing gas supply apparatus 18, and the water supply apparatus 20 are controlled by the control device 24. A detector 78 for detecting the fuel gas is electrically connected to the control device 24. For example, a commercial power source 80 (or other components such as a load or a secondary battery) is connected to the power converter 22 through a power cable 79.

Figure 1:
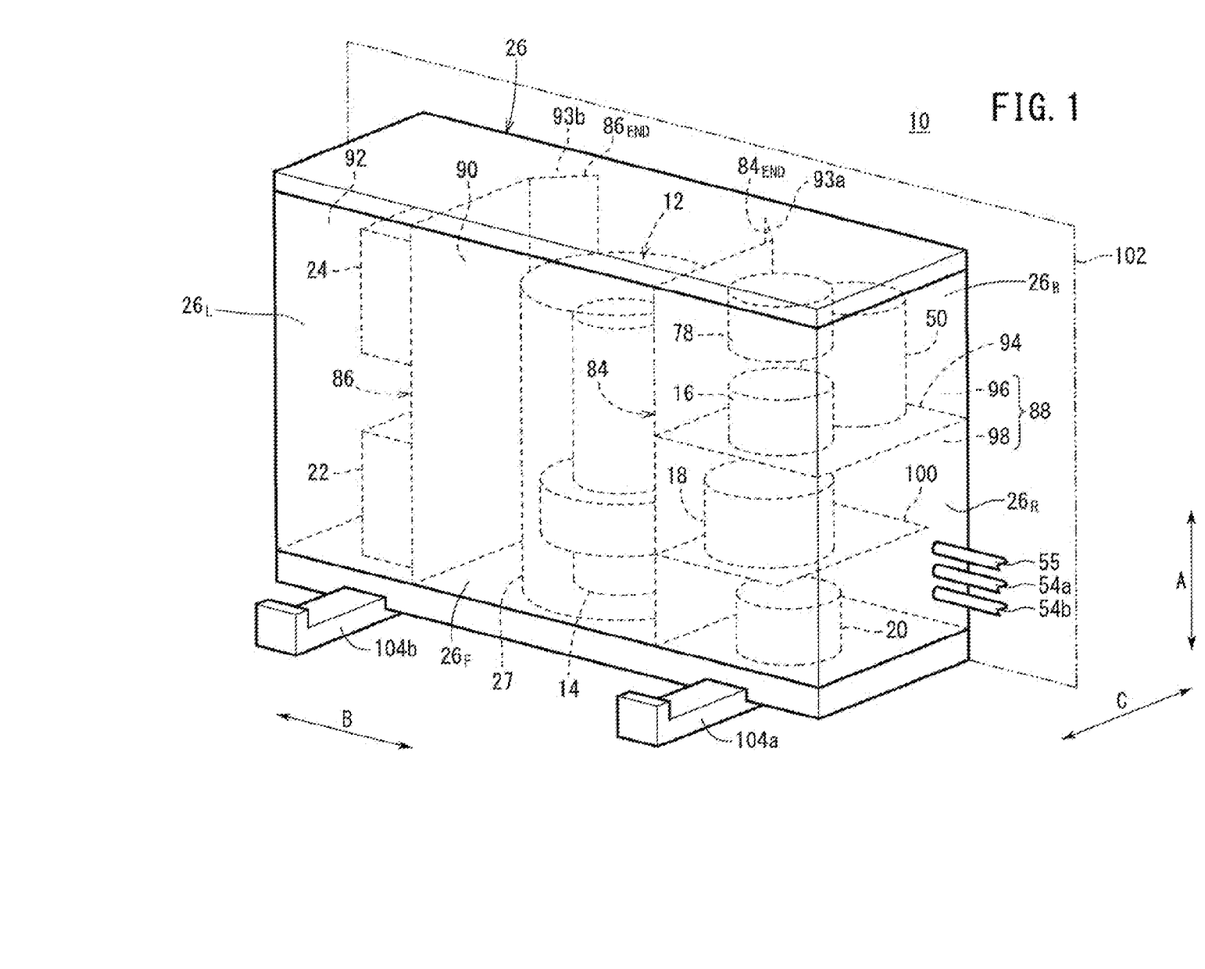
FIG. 1 is a perspective view schematically showing a fuel cell system according to a first embodiment of the present invention.
Figure 2:
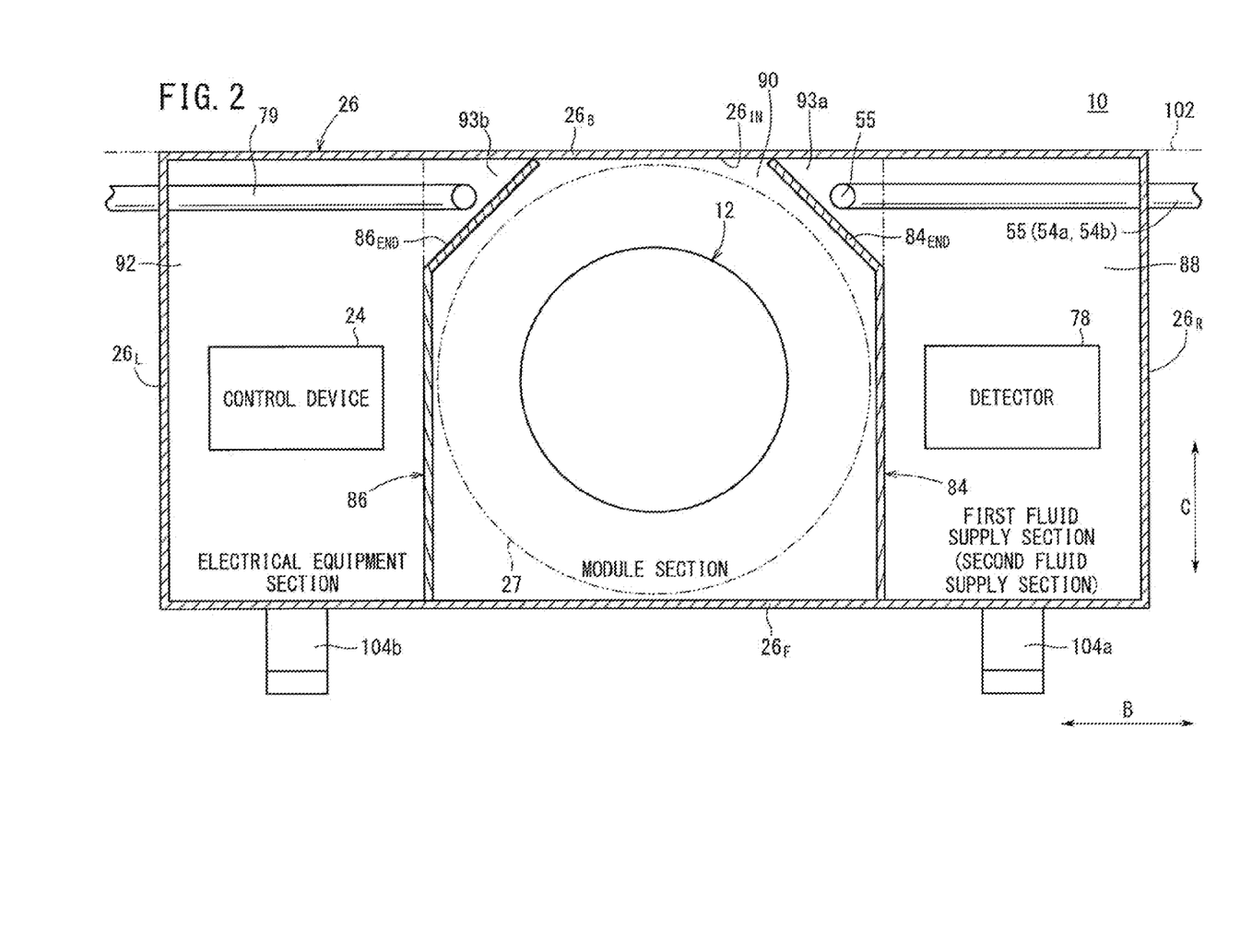
FIG. 2 is a plan view showing the fuel cell system.

As shown in FIGS. 1 to 3, the casing 26 has a rectangular shape elongated in a direction indicated by an arrow B as a whole. In the casing 26, a first vertical partition plate (partition member) 84 and a second vertical partition plate (partition member) 86 are provided upright at predetermined intervals for dividing the space in the casing 26 in a horizontal direction indicated by the arrow B. The space in the casing 26 is divided into a fluid supply section 88, a module section 90, and an electrical equipment section 92 by the first vertical partition plate 84 and the second vertical partition plate 86. The module section 90 is interposed between the fluid supply section 88 and the electrical equipment section 92.

As shown in FIGS. 1 and 2, at the first vertical partition plate 84, at least any of the raw fuel pipe 55 (as necessary, the raw fuel channel 56 and the raw fuel branch channel 72) of the fuel gas supply apparatus 16 as a passage of the raw fuel (fuel gas), an oxygen-containing gas pipe (e.g., the air supply pipe 44 and the air branch channel 76) of the oxygen-containing gas supply apparatus 18 as a passage of the oxygen-containing gas, and a water pipe (e.g., the water channel 58) for supplying water to the water supply apparatus 20 is provided in a recess 93a recessed toward the module section 90. In the first embodiment, the raw fuel pipe 55 is provided in the recess 93a.

As shown in FIG. 2, the first vertical partition plate 84 extends from a front plate $26_F$ of the casing 26 toward a back plate $26_B$ of the casing 26. The recess 93a is formed by bending a marginal end portion $84_{END}$ of the first vertical partition plate 84 on the back plate $26_B$ side toward the module section 90 at a predetermined angle. The recess 93a is positioned adjacent to an inner wall surface $26_{IN}$ of the casing 26 on the back plate $26_B$ side. The recess 93a has a substantially triangular shape in a plan view of the casing 26.

At the second vertical partition plate 86, at least the power cable 79 is provided in a recess 93b recessed toward the module section 90. The second vertical partition plate 86 extends from the front plate $26_F$ of the casing 26 toward the back plate $26_B$ of the casing 26. The recess 93b is formed by bending a marginal end portion $86_{END}$ of the second vertical partition plate 86 on the back plate $26_B$ side toward the module section 90 at a predetermined angle. The recess 93b is positioned adjacent to the inner wall surface $26_{IN}$ of the casing 26 on the back plate $26_B$ side. The recess 93b has a substantially triangular shape in the plan view of the casing 26.

As shown in FIGS. 1 and 3, the fluid supply section 88 is divided into a first supply section 96 at an upper position and a second supply section 98 at a lower position by a lateral partition plate 94. The condenser 50, the fuel gas supply apparatus 16, and the detector 78 are placed in the first supply section 96. The detector 78 is provided above the fuel gas supply apparatus 16. The oxygen-containing gas supply apparatus 18 and the water supply apparatus 20 are placed in the second supply section 98. The water supply apparatus 20 is provided at the bottom of the fluid supply section 88. The oxygen-containing gas supply apparatus 18 is held on a table 100 in the second supply section 98.

As shown in FIGS. 1 and 3, the fuel cell module 12 and the combustor 14 are placed in the module section 90. The fuel cell module 12 is provided above the combustor 14. The power converter 22 and the control device 24 are provided in the electrical equipment section 92.

As shown in FIGS. 1 and 2, the casing 26 is elongated in a lateral direction indicated by the arrow B in which the fluid supply section 88, the module section 90, and the electrical equipment section 92 are arranged, and the dimension in the depth direction indicated by the arrow C intersecting with the lateral direction is reduced. The back surface in the depth direction is placed along a wall surface 102.

The casing 26 includes the front plate $26_F$, the back plate $26_B$, a right side plate $26_R$, and a left side plate $26_L$. The raw fuel pipe 55, the coolant supply pipe 54a, and the coolant discharge pipe 54b protrudes from the right side plate $26_R$ of the casing 26 to the outside, and the power cable 79 protrudes from the left side plate $26_L$ of the casing 26 to the outside. For ease of maintenance operation or the like, the front plate $26_F$ may have an openable door (not shown). Likewise, the right side plate $26_R$ and the left side plate $26_L$ may have openable doors. Further, as necessary, guide members such as a pair of slide rails 104a, 104b may be provided to allow the casing 26 to be movable back and forth in the direction indicated by the arrow C.

Operation of the fuel cell system 10 will be described below.

As shown in FIG. 4, by operation of the fuel gas supply apparatus 16, for example, a raw fuel such as the city gas (including $CH_4$, $C_2H_6$, $C_3H_8$, $C_4H_{10}$) is supplied to the raw fuel channel 56. Further, by operation of the water supply apparatus 20, water is supplied to the water channel 58, and the oxygen-containing gas such as air is supplied to the air supply pipe 44 through the oxygen-containing gas supply apparatus 18.

In the evaporator 38, the raw fuel flowing through the raw fuel channel 56 is mixed with the water vapor, and a mixed fuel is obtained. The mixed fuel is supplied to the reformer 40. The mixed fuel undergoes steam reforming in the reformer 40. Thus, hydrocarbon of $C_{2+}$ is removed (reformed), and a reformed gas (fuel gas) chiefly containing methane is obtained. The reformed gas is supplied to the fuel cell stack 34. Thus, the methane in the reformed gas is reformed, and the hydrogen gas is obtained. The fuel gas chiefly containing the hydrogen gas is supplied to the anodes (not shown).

The air supplied from the air supply pipe 44 to the heat exchanger 36 moves along the heat exchanger 36, and preheated to a predetermined temperature by heat exchange with the exhaust gas as described later. The air heated by the heat exchanger 36 is supplied to the cathodes (not shown).

Thus, in each of the electrolyte electrode assemblies, by electrochemical reactions of the fuel gas and the air, power generation is performed. The hot exhaust gas (several hundred ° C.) discharged to the outer circumferential region of each of the electrolyte electrode assemblies flows through the heat exchanger 36, and heat exchange with air is carried out. The air is heated to a predetermined temperature, and the temperature of the exhaust gas is decreased.

When the exhaust gas moves along the evaporator 38, the water passing through the water channel 58 is evaporated. After the exhaust gas passes through the evaporator 38, the exhaust gas is supplied to the condenser 50 through the main exhaust pipe 46. The hot water in the hot water tank 52 is supplied to the condenser 50 through the coolant supply pipe 54a, and the hot water is heated by heat exchange with the exhaust gas. The heated hot water is returned to the hot water tank 52 through the coolant discharge pipe 54b. Therefore, for example, the hot water tank 52 is used, as a water heater for home use.

In the first embodiment, as shown in FIG. 2, the first vertical partition plate 84 extends from the front plate $26_F$ of the casing 26 toward the back plate $26_B$ of the casing 26. The recess 93a is formed by bending the marginal end portion $84_{END}$ of the first vertical partition plate 84 on the back plate $26_B$ side toward the module section 90 at a predetermined angle. At least the raw fuel pipe 55 oriented vertically is provided in the recess 93a.

In the structure, the raw fuel pipe 55 is provided in a dead space of a lower temperature area separated from the module section 90 by the first vertical partition plate 84 as the partition member. Therefore, the raw fuel flowing through the raw fuel pipe 55 is not thermally affected by the module section 90, and the temperature of the raw fuel does not become high easily. In the structure, improvement in the durability of components such as sensors and electronic parts attached to the raw fuel pipe 55 is achieved.

Further, in the casing 26, the space required for pipes can be reserved in the dead space. Therefore, it becomes easier to arrange fluid pipes including the raw fuel pipe 55 efficiently in a limited space, and the overall size of the casing 26 can be reduced easily.

Further, the second vertical partition plate 86 extends from the front plate $26_F$ of the casing 26 toward the back plate $26_B$ of the casing 26. The recess 93b is formed by bending the marginal end portion $86_{END}$ of the second vertical partition plate 86 on the back plate $26_B$ side toward the module section 90 at a predetermined angle. At least the power cable 79 oriented vertically is provided in the recess 93b.

Therefore, the power cable 79 is not thermally affected by the module section 90, and the temperature of the power cable 79 does not become high easily. In the structure, improvement in the durability of components such as sensors and electronic parts attached to the power cable 79 is achieved.

Further, in the casing 26, the space required for cables can be reserved in the dead space. Therefore, it becomes easier to arrange cables including the power cable 79 efficiently in a limited space, and the overall size of the casing 26 can be reduced easily.

Figure 5:
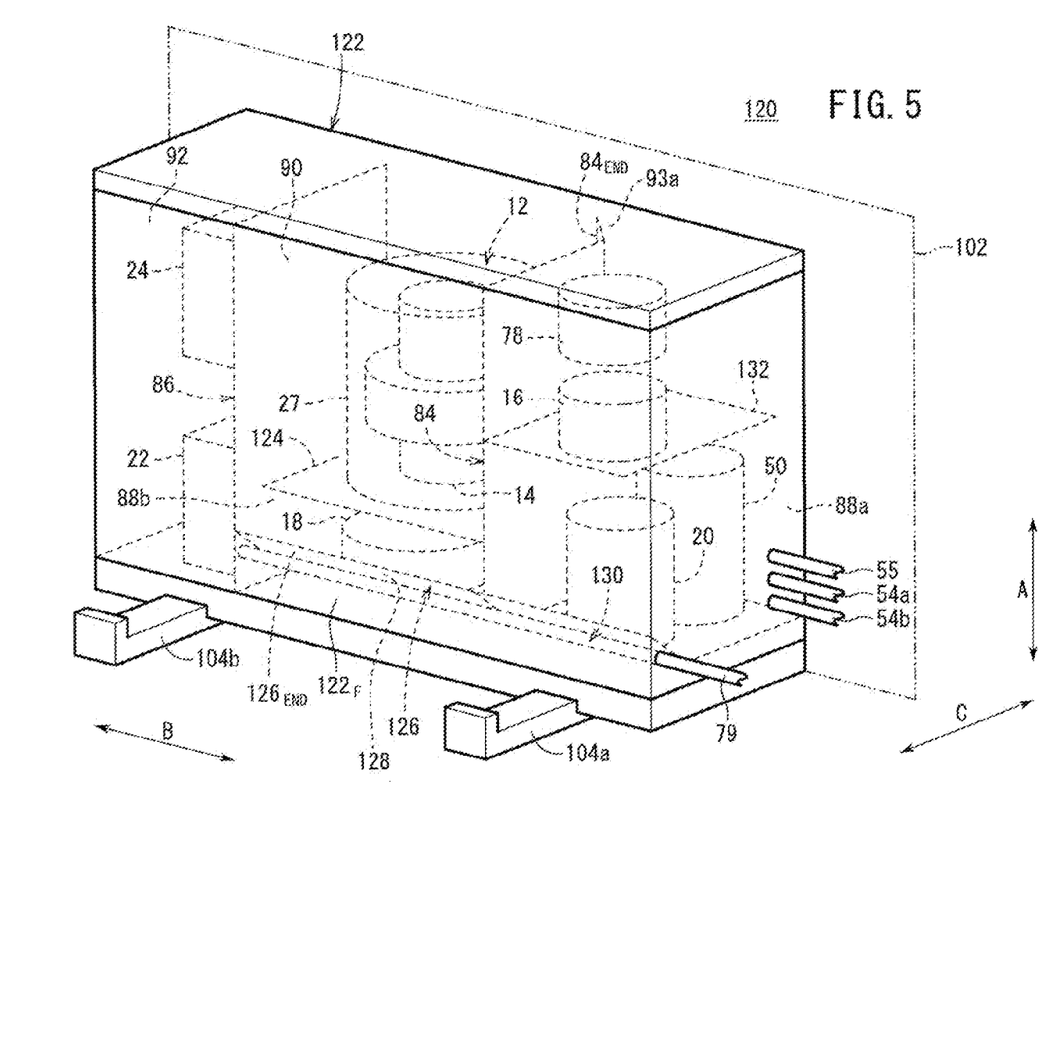
FIG. 5 is a perspective view schematically showing a fuel cell system according to a second embodiment of the present invention.
Figure 6:
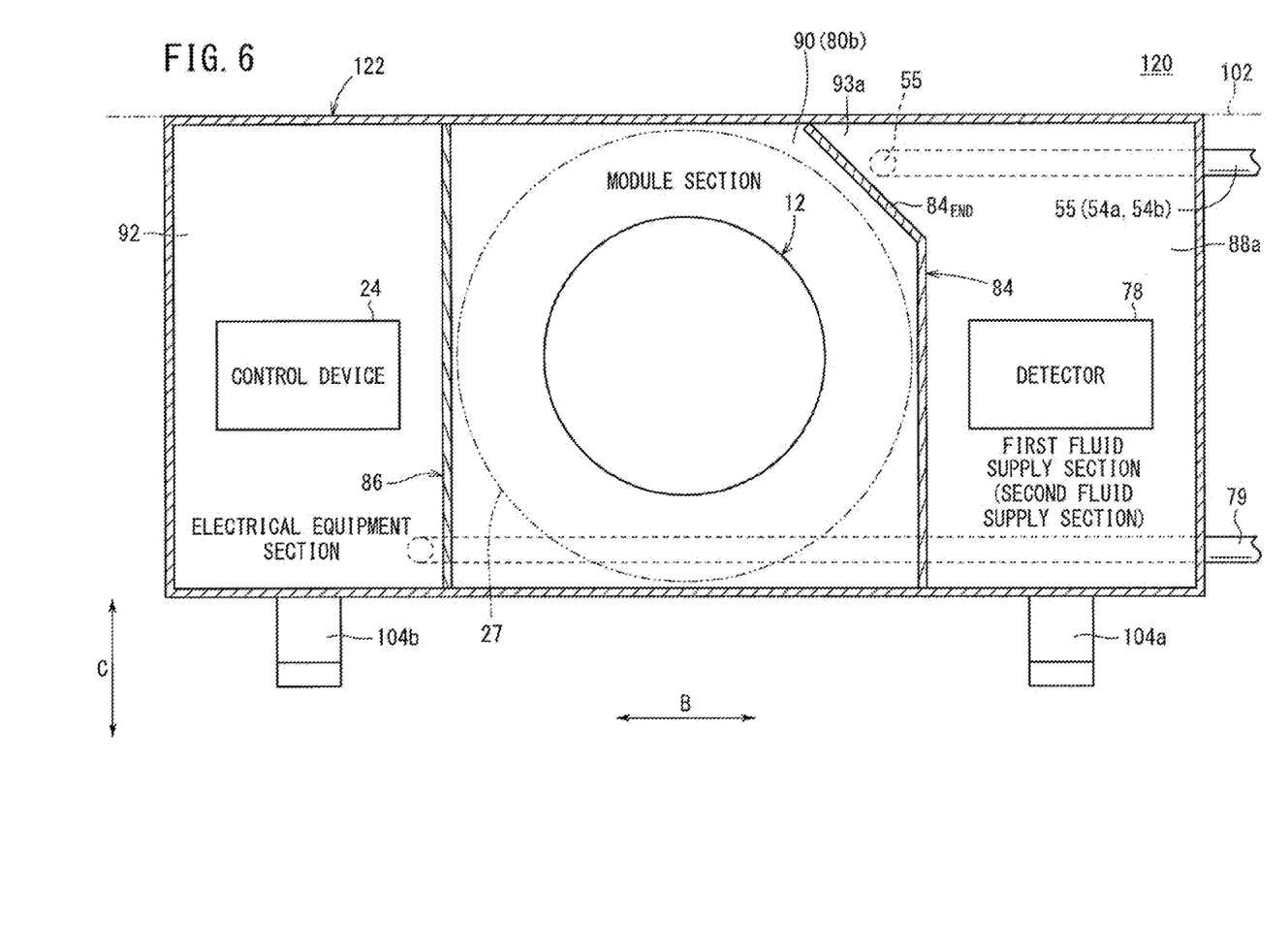
FIG. 6 is a plan view showing the fuel cell system.
Figure 7:
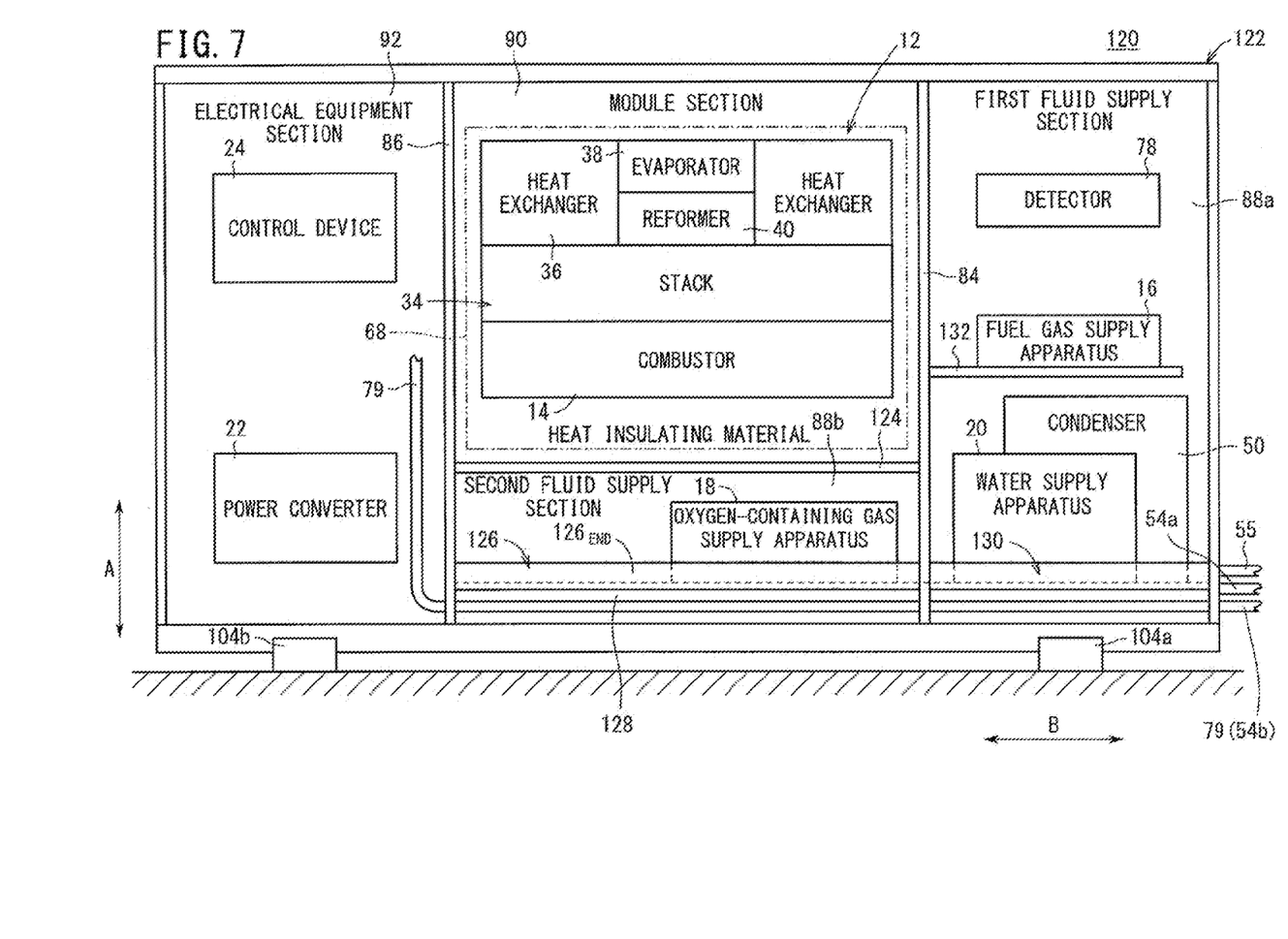
FIG. 7 is a front view showing the fuel cell system.

FIG. 5 is a perspective view schematically showing a fuel cell system 120 according to a second embodiment of the present invention. The constituent elements that are identical to those of the fuel cell system 10 according to the first embodiment are labeled with the same reference numerals, and descriptions thereof will be omitted. Further, also in a third embodiment as described later, the constituent elements that are identical to those of the fuel cell system 10 according to the first embodiment are labeled with the same reference numerals, and descriptions thereof will be omitted.

The fuel cell system 120 includes a casing 122. The space in the casing 122 is divided into a first fluid supply section 88a, a module section 90, and an electrical equipment section 92 by a first vertical partition plate 84 and a second vertical partition plate 86. The module section 90 is interposed between the first fluid supply section 88a and the electrical equipment section 92. A second fluid supply section 88b is formed below the module section 90 by a lateral partition plate 124.

A table plate (partition member) 126 is provided in the second fluid supply section 88b, and an oxygen-containing gas supply apparatus 18 is placed on the table plate 126. The table plate 126 has a recess 128 recessed toward a front plate $122_F$ side of the casing 122 for providing at least a power cable 79 in the recess 128. The table plate 126 extends in a horizontal direction, and the recess 128 is formed by bending a marginal end portion $126_{END}$ of the table plate 126 on the front plate $122_F$ side upward at a predetermined angle.

A water supply apparatus 20, a condenser 50, a fuel gas supply apparatus 16, and a detector 78 are disposed in the first fluid supply section 88a. The water supply apparatus 20 is placed at the bottom of the first fluid supply section 88a using a table plate 130, and the detector 78 is provided above the fuel gas supply apparatus 16. The table plate 130 may have the same structure as the table plate 126. The fuel gas supply apparatus 16 is held on a table 132 in the first fluid supply section 88a.

The first vertical partition plate 84 has the recess 93a on the module section 90 side, and the second vertical partition plate 86 does not have any recess. The second fluid supply section 88b may have a recess as necessary.

In the second embodiment, the table plate 126 has the recess 128 formed by bending the marginal end portion $126_{END}$ of the table plate 126 on the front plate $122_F$ side of the casing 122 upward at a predetermined angle. The power cable 79 oriented horizontally is provided in the recess 128.

In the structure, the power cable 79 is provided in a dead space of a lower temperature area, and the same advantages as in the case of the first embodiment are obtained. In the first and second embodiments, the fuel cell module 12 has a cylindrical shape. However, the present invention is not limited in this respect.

Figure 8:
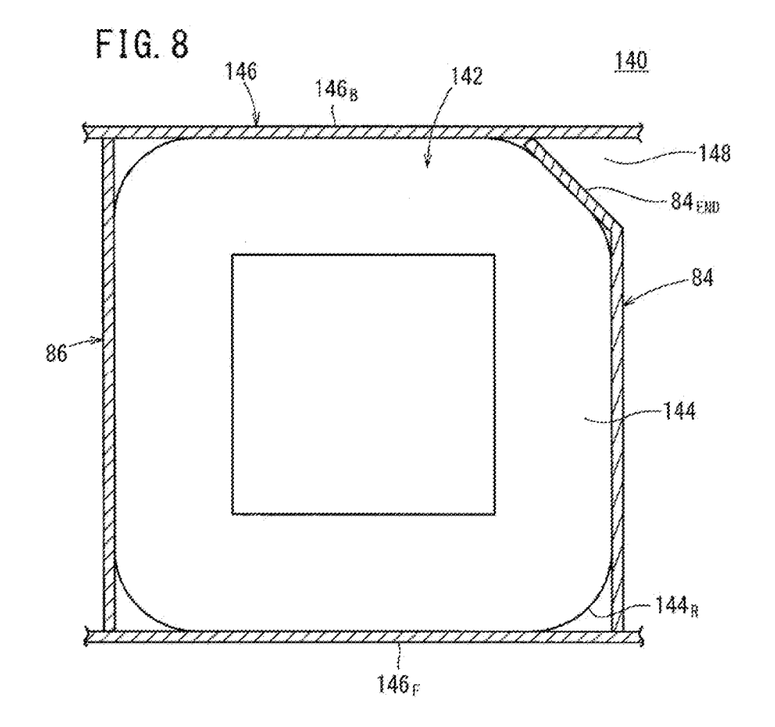
FIG. 8 is a plan view showing main components of a fuel cell system according to a third embodiment of the present invention.

For example, a fuel cell system 140 according to a third embodiment shown in FIG. 8 includes a fuel cell module 142 having a polygonal pillar shape, e.g., a rectangular parallelepiped shape. The fuel cell module 142 is surrounded by heat insulating material 144. The heat insulating material 144 include circular arc shaped portions $144_R$ corresponding to four corners of the fuel cell module 142.

A first vertical partition plate 84 extends from a front plate $146_F$ of a casing 146 toward a back plate $146_B$ of the casing 146. A recess 148 is formed by bending the marginal end portion $84_{END}$ of the first vertical partition plate 84 on the back plate $146_B$ side toward the fuel cell module 142 at a predetermined angle. Specifically, the marginal end portion $84_{END}$ of the first vertical partition plate 84 is bent along one of the circular arc shaped portions $144_R$ of the heat insulating material 144 on the back side.

Accordingly, in the third embodiment, the same advantages as in the case of the first embodiment are obtained. The second vertical partition plate 86 may have the same structure as the first vertical partition plate 84.

While the invention has been particularly shown and described with reference to preferred embodiments, it will be understood that variations and modifications can be effected thereto by those skilled in the art without departing from the scope of the invention.

The invention claimed is:

1. A fuel cell system comprising:
 a fuel cell module for generating electrical power by electrochemical reactions of a fuel gas and an oxygen-containing gas;
 a fuel gas supply apparatus for supplying the fuel gas to the fuel cell module;
 an oxygen-containing gas supply apparatus for supplying the oxygen-containing gas to the fuel cell module;
 a water supply apparatus for supplying water to the fuel cell module;
 a power converter for converting direct current power generated in the fuel cell module to electrical power;
 a control device for controlling an amount of electrical power generated in the fuel cell module; and
 a casing containing the fuel cell module, the fuel gas supply apparatus, the oxygen-containing gas supply apparatus, the water supply apparatus, the power converter, and the control device,
 wherein the casing is divided by partition members into a module section where the fuel cell module is provided, a fluid supply section where the fuel gas supply apparatus, the oxygen-containing gas supply apparatus, and the water supply apparatus are provided, and an electrical equipment section where the power converter and the control device are provided; and
 one of the partition members, which divides at least the module section from the fluid supply section or the electrical equipment section, includes a recess recessed toward the module section, and at least any of a fuel gas pipe of the fuel gas supply apparatus as a passage of the fuel gas, an oxygen-containing gas pipe of the oxygen-containing gas supply apparatus as a passage of the oxygen-containing gas, and a water pipe of the water supply apparatus as a passage of the water is provided in the recess, the fuel cell system further comprises heat insulating material surrounding the fuel cell module, the heat insulating material has a circular shape in a plan view or a polygonal shape in a plan view, the polygonal shape having a circular arc shaped portion at a corner, the recess has a substantially triangular shape in a plan view, the triangular shape slopes along a peripheral surface of the circular shape of the heat insulating material from an end of a plate that extends along the peripheral surface of the circular shape of the heat insulating material, or slopes along a circular arc surface of the circular arc shaped portion of the polygonal shape of the heat insulating material from an end of a plate that extends along a flat surface of the polygonal shape of the heat insulating material.

2. The fuel cell system according to claim 1, wherein the recess is provided adjacent to an inner wall surface of the casing.

3. The fuel cell system according to claim 1, wherein the recess is provided adjacent to a back plate of the casing which is opposite to a front plate of the casing.

4. The fuel cell system according to claim 1, wherein a power cable is provided in the recess.

\* \* \* \* \*